United States Patent [19]

Cook et al.

[11] Patent Number: 4,786,695
[45] Date of Patent: * Nov. 22, 1988

[54] METHOD AND REACTOR SYSTEM FOR RAPID KILL GAS INJECTION TO GAS PHASE POLYMERIZATION REACTORS

[75] Inventors: John E. Cook, Westfield; Robert O. Hagerty, Edison, both of N.J.; Frederick W. Jacob, Houston, Tex.

[73] Assignee: Mobil Oil Corporation, New York, N.Y.

[ * ] Notice: The portion of the term of this patent subsequent to Oct. 15, 2002 has been disclaimed.

[21] Appl. No.: 4,925

[22] Filed: Jan. 20, 1987

Related U.S. Application Data

[63] Continuation of Ser. No. 737,565, May 23, 1985, Pat. No. 4,666,999, which is a continuation of Ser. No. 528,502, Sep. 1, 1983, abandoned.

[51] Int. Cl.[4] .................................................. C08F 2/38
[52] U.S. Cl. .......................................... 526/84; 526/82
[58] Field of Search .................................... 526/82, 84

[56] References Cited

U.S. PATENT DOCUMENTS

| | | | |
|---|---|---|---|
| 3,708,465 | 1/1973 | Dietrich et al. | 260/93.7 |
| 4,306,044 | 12/1981 | Charsley | 526/84 |
| 4,326,048 | 4/1982 | Stevens et al. | 526/68 |
| 4,547,555 | 10/1985 | Cook et al. | 526/60 |

FOREIGN PATENT DOCUMENTS 0001150 9/1978 European Pat. Off. .

Primary Examiner—Joseph L. Schofer
Assistant Examiner—Peter Mulcahy
Attorney, Agent, or Firm—Alexander J. McKillop; Michael G. Gilman; Stanislaus Aksman

[57] ABSTRACT

There is provided an improvement in a method for terminating a gas phase olefin polymerization reaction with a kill gas such as carbon monoxide or carbon dioxide. The improvement involves the use of a carrier gas to increase the rate of penetration of kill gas into the reaction medium. The improved method is particularly adaptable to a fluid bed reactor system.

14 Claims, 1 Drawing Sheet

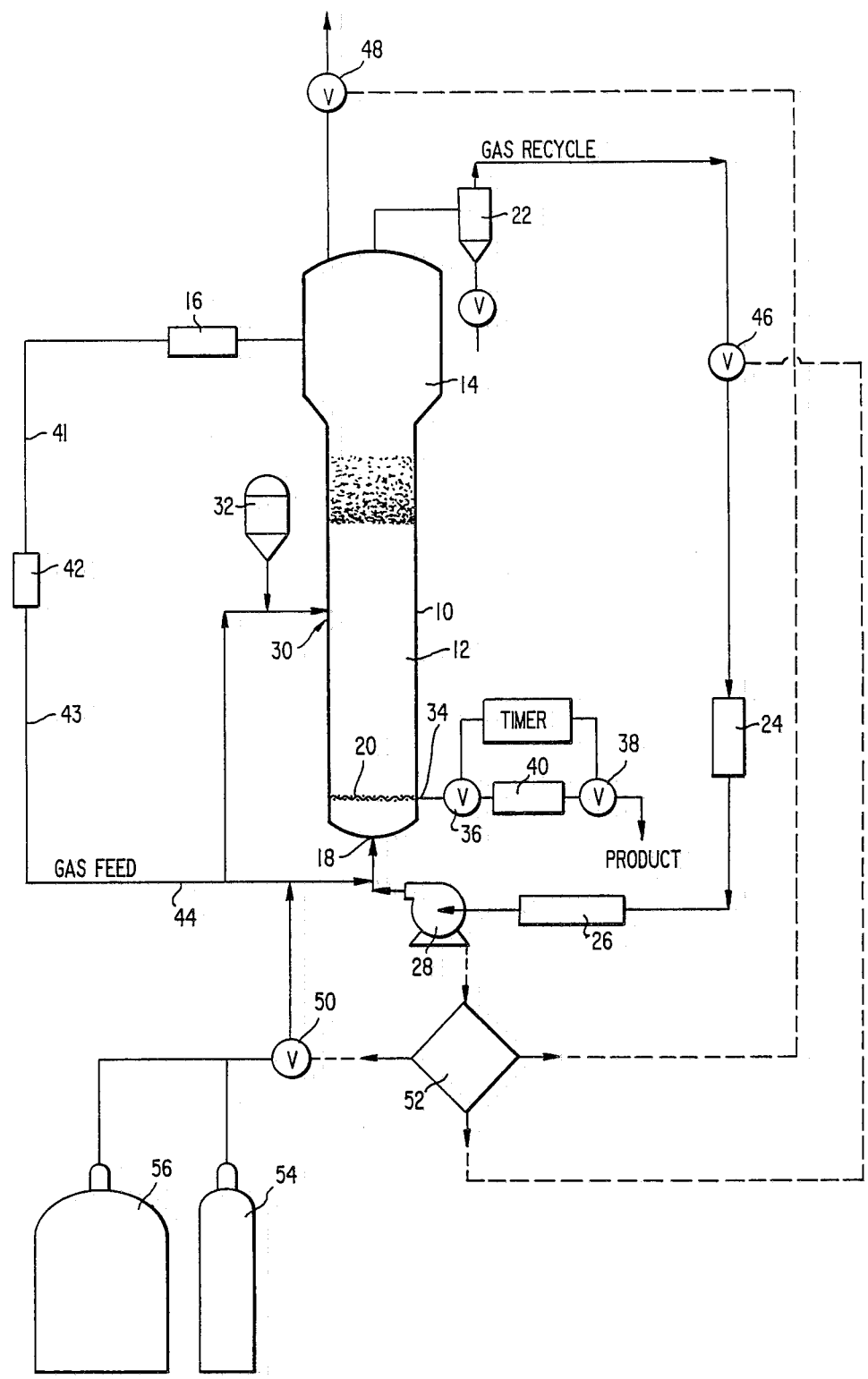

METHOD AND REACTOR SYSTEM FOR RAPID KILL GAS INJECTION TO GAS PHASE POLYMERIZATION REACTORS

CROSS-REFERENCE TO RELATED APPLICATION

This is a continuation of application Ser. No. 737,565, filed on May 23, 1985, now U.S. Pat. No. 4,666,999, which was a continuation of Ser. No. 528,502, filed on Sept. 1, 1983, now abandond.

BACKGROUND OF THE INVENTION

This invention relates to a method and a reactor system for rapid kill gas injection to gas phase polymerization reactors.

The Stevens et al U.S. Pat. No. 4,326,048, the entire disclosure of which is expressly incorporated herein by reference, describes a method for terminating a gas phase olefin polymerization by injection a carbon oxide. The injection of carbon oxide may take place downstream of the polymerization reactor, e.g., in the recycle gas line (Note column 4, lines 29–33 of the Stevens et al U.S. Pat. No. 4,326,048). The gas phase olefin polymerization may take place in stirred bed reactors or fluidized bed reactors. An example of such a fluidized bed reactor is described in the Miller U.S. Pat. No. 4,003,712, the entire disclosure of which is incorporated by reference into the above-mentioned Stevens et al patent and is also expressly incorporated by reference herein.

The Charsley U.S. Pat. No. 4,306,044, the entire disclosure of which is incorporated herein by reference, describes a means for introducing carbon dioxide into a gas-phase olefin polymerization system to at least reduce the rate of polymerization. For example, the carbon dioxide may be injected manually when the polymerization does not respond to other means of control (Note column 3, lines 53–59 of the Charsley U.S. Pat. No. 4,306,044). One other means of control is by rapid venting of the reactor (Note column 1, lines 15–20 of the Charsley U.S. Pat. No. 4,306,044). Accordingly, the Charsley U.S. Pat. No. 4,306,044 suggests the introduction of carbon dioxide into a gas-phase olefin polymerization reaction while venting is taking place.

The Charsley U.S. Pat. No. 4,306,044 also suggests that the polymerization system may be equipped with a means for sensing a potentially dangerous condition and a means operative with this sensing means for automatically introducing carbon dioxide into the polymerization system. For example, the sensing means may comprise a motion swith on a stirrer shaft which detects failure of rotation of the stirrer.

The importance of being able to rapidly reduce the rate of reaction is pointed out, e.g., at column 1, lines 15–30, of the Charsley U.S. Pat. No. 4,306,044. More particularly, a run-away reaction can result in fusing of the polymer into a large mass which can only be broken up with great difficulty.

The Karol et al U.S. Pat. No. 4,302,566, the entire disclosure of which is expressly incorporated herein by reference, describes a fluidized bed reactor similar to that described in the aforementioned Miller U.S. Pat. No. 4,003,712. This Karol et al patent suggests that it is essential to operate the fluid bed reactor at a temperature below the sintering temperature of the polymer particles (Note column 12, lines 39–53 of the Karol et al U.S. Pat. No. 4,302,566). In normal operation, the temperature of the fluidized bed is primarily controlled by passing recycle gas through a compressor and then through a heat exchanger, wherein the recycle gas is stripped of heat of reaction before it is returned to the fluidized bed (Note column 11, lines 35–53).

If the compressor in the fluidized bed arrangement fails, e.g., due to electrical or mechanical failure, the cooling means for controlling the temperature in the bed becomes inoperative. Since olefin reactants are still in contact with active catalyst, exothermic heat of reaction causes the temperature of the bed to climb toward sintering temperatures in a run-away fashion. This situation would warrant an emergency shut down of the reactor. As suggested by the aforementioned Charsley U.S. Pat. No. 4,306,044, one might attempt to vent olefins from the reactor as fast as possible in an attempt to control the run-away reaction. In this regard, it is noted that the fluidized bed system as described in the Karol et al U.S. Pat. No. 4,302,566 is expressly provided with a venting system for shut down. (Note column 13, lines 56–58 of this Karol et al patent). However, there are practical constraints to the rate at which olefins can be vented from the reactor. More particularly, olefins cannot simply be released to the atmosphere for environmental reasons. Consequently, vented olefins are burned by passing same through a flare. Accordingly, further constraints result from the fact that the rate at which olefins are vented from the reactor cannot exceed the capacity of the flare in terms of the maximum rate at which olefins can be burned. Building flares of greater capacity involves greater construction costs. Furthermore, the size of the fireball when a large flare is operating at full capacity may be prohibitive for environmental or safety reasons.

It will be appreciated that the volume of carbon oxide kill gas which is needed to terminate olefin polymerization is practically negligible in comparison with the total volume of gas in a fluid bed reactor. Furthermore, when flow of recycle gas through the reactor ceases due to compressor failure, the pressure gradient across the bed becomes essentially zero. Accordingly, if kill gas is merely injected at a point below the bed, there is essentially no pressure gradient across the bed to induce the flow of kill gas through the bed. A pressure gradient across the bed can be induced by venting gas from the top of the bed, which venting would be expected in an emergency shut down operation. However, as previously mentioned, there are practical constraints as to the rate at which olefin containing gas can be vented from the reactor. Therefore, even when kill gas injection is accompanied by venting of the reactor, the rate of penetration of kill gas to catalyst particles may be relatively slow due to practical constraints associated with the rate at which the reactor can be vented. Unless the reaction is killed rapidly, the sintering temperature of the polymer particles may be exceeded. Accordingly, there is a need in the art for faster methods of killing the olefin polymerization reaction.

SUMMARY OF THE INVENTION

According to one aspect of the invention, there is provided an improved method for terminating a gas phase olefin polymerization reaction, said method comprising the injection of an amount of kill gas into the reaction medium sufficient to terminate the reaction, the improvement comprising increasing the rate of penetration of kill gas into the reaction medium by injecting a sufficient rate increasing amount of a non-catalyst-poisoning carrier gas into the reaction medium along with said kill gas.

According to another aspect of the invention, there is provided a method for rapidly terminating a gas phase olefin polymerization reaction in a fluid bed reactor system, said reactor system comprising a vertical reactor wherein said polymerization takes place and a fluidizing medium recycle line means in fluid communication with said reactor powered by a compressor, said method being actuated in the event of failure of said compressor, said method comprising the steps of:

(i) closing off said recycle line means by closing one or more valves in said recycle line means;
(ii) injecting an amount of carbon oxide gas sufficient to terminate said polymerization, said injection taking place at the bottom of said reactor at a point below the polymer bed in said reactor;
(iii) venting gas from the top of the reactor at a point above said polymer bed; and
(iv) injecting nitrogen carrier gas at the bottom of said reactor at a point below the polymer bed in said reactor, the amount of said nitrogen carrier gas being sufficient to increase the rate at which said carbon oxide gas is transported to the top of said polymer bed, wherein said steps (i)–(iv) are carried out simultaneously, substantially simultaneously or in any particular sequence, provided that said steps are carried out in a manner such that the sintering temperature of the polymer in said polymer bed is not exceeded.

According to another aspect of the invention, there is provided a kill system which is added to the fluid bed reactor system claimed in the Miller U.S. Pat. No. 4,003,712, issued Jan. 18, 1977. More particularly this Miller patent claims a fluid bed reactor system in which olefin monomers may be catalytically polymerized continuously in a fluid bed under gas medium fluidized conditions, and comprising:

a vertical reactor having a cylindrical lower section and an upper section having a cross section greater than that of said lower section, said lower section being adapted to house a polymerization zone in which the catalyzed polymerization reaction may be conducted under gas medium fluidized fluid bed conditions, and said upper section being adapted to function as a velocity reduction zone for the recovery of particles entrained in fluidizing medium entering said upper section from said lower section, fluidizing medium permeable distribution plate means within and towards the base of said lower section, said distribution plate means being adapted to diffuse fluidizing medium up through the fluidized bed in said lower section and to support said bed thereon when said bed is quiescent; fluidizing medium supply line means in gas communication with, and adapted to supply fluidizing medium and make up gas to, the lower section of said reactor and below said distribution plate means;

catalyst injection means in catalyst supply communication with, and adapted to supply particulate olefin polymerization catalyst to the side of the fluidized bed in the polymerization zone in said lower section;

polymer product recovery means in polymer product recovery communication with, and adapted to recover polymer product from, the base of said polymerization zone and above said distribution plate means;

said polymer product meanns comprising a valved chamber which is adapted to recover polymer product from said reactor at a rate equal to the rate of polymer product formation with the aid of a pressure differential between the pressure within said reactor and the pressure within said chamber;

fluidizing medium recycle line means in gas communication with said reactor and adapted to recover fluidizing medium fom the upper section of said reactor and to recycle the thus recovered fluidizing medium to the lower section of said reactor at a point below said distribution plate means;

heat exchange means within said recycle line means adapted to remove heat of reaction from the recycled fluidizing medium;

gas analyzer means in gas communication with said velocity reduction zone and adapted to analyze gas component deficiency in the fluidizing medium in said velocity reduction zone;

said fluidizing medium supply line means being in gas communication with said recycle line means and in gas supply activating response communication with said gas analyzer means and adapted to supply deficient components of the fluidizable medium to said recycle line means in response to gas supply activating communication from said gas analyzer means.

The fluidizing medium recycle line means as claimed in the Miller U.S. Pat. No. 4,003,712, may be powered by a compressor. The kill system which is added to the fluid bed reactor system of the Miller patent comprises:

valve means comprising one or more valves, said valve means being capable of closing off said fluidizing medium recycle line means when said compressor is not operating;

carbon oxide injection means capable of injecting carbon oxide into said reactor below said distribution plate means;

venting means for venting gas from the top of said reactor;

nitrogen carrier gas injection means capable of injecting nitrogen into said reactor below said distribution plate means; and automatic reaction kill means comprising a compressor failure sensing means in operative connection with said valve means, carbon oxide injection means, said venting means and said nitrogen carrier gas injection means, said kill means being capable of sensing failure of said compressor and automatically actuating said valve means, said carbon oxide injection means, said venting means and said nitrogen carrier gas means, whereby said fluidizing medium recycle line means is closed off, gas is vented from the top of said reactor, and carbon oxides carried by said nitrogen carrier gas is passed through said bed.

BRIEF DESCRIPTION OF THE DRAWING

The drawing shows an example of a gas phase fluid bed reactor system in which the kill system of the present invention may be employed.

DETAILED DESCRIPTION

A rapid termination of polymerization in a fluid bed reactor is required in the event of an emergency loss of cooling gas flow from the recycle compressor. This emergency would occur, for example, from a loss of electrical power or mechanical failure of the compressor.

When cooling flow is lost, the exothermic heat of reaction may cause the temperature of the polyethylene bed to rise at a rate of, e.g., as high as about 4° C. per minute. If the polyethylene is allowed to reach a temperature greater than its sticking point (approximately 95°-100° C. for linear low density polyethylene) the bed will fuse together into a solid mass, and will necessitate a major plant shutdown.

To prevent any possibility of overheating, the fluid bed should be normally operated well below the sticking point. For example, a 10° C. margin allows enough time (about 3 minutes) for an emergency kill system to operate if a cooling eemergency occurs.

The present invention reduces the response time of the kill system, and consequently enables fluid bed reactor operation at higher temperatues. This gives two major process advantages. For a fixed temperature of cooling gas flow to the reactor (which has a minimum value limied by the condensation or dew point temperature) a higher bed temperature increases the differential available for heat transfer, and allows a higher production rate of resin. Alternatively, production rates may be maintained at normal levels and the dew point temperature of the cooling gas increased by adding more comonomer such as hexene. A higher comonomer concentration in the recycle gas and the reactor would allow production of lower density copolymers.

The kill gas which is used in accordance with the present invention, may be any gas which is capable of poisoning the olefin polymerization catalyst to the extent of terminating the polymerization. Reversible catalyst poisons such as carbon oxides (i.e. carbon monoxide, carbon dioxide and mixtures thereof) are preferred as opposed to the less preferred irreversible catalyst poisons such as oxygen containing gases (e.g., essentially pure oxygen or air). By use of reversible catalyst poisons, it is possible to reactivate poisoned catalyst simply by purging the reactor of these poisons. Such purging will not reactivate catalysts poisoned with irreversible catalyst poisons.

The olefin polymerization catalysts which are capable of being poisoned in accordance with the present invention include catalyst systems based on compounds of transition metals. A preferred class of such transition metal compound containing catalysts include Ziegler-type catalysts, which may be characterized as chemical complexes derived from a transition metal halide (e.g., $TiCl_4$) and a metal hydride or a metal alkyl (e.g., aluminum alkyl).

The carrier gas which is used in accordance with the present invention may be any gas which is essentially catalytically inert in the sense that it is not essentially capable of poisoning the olefin polymerization catalyst, thereby substantially reducing the polymerization activity thereof. Suitable carrier gases include reactive gases such as the olefin feed gases to the reactor (e.g., ethylene), and, more preferably, non-reactive gases such as argon, helium and, especially nitrogen.

The kill gas and carrier gas are injected into the reactor in a manner such that the kill gas is carried along with the carrier. Accordingly, the kill gas is normally injected at the same point as the carrier gas or slightly downstream from the carrier gas. With regard to injection of the kill gas and carrier gas at the same point, it is noted that the kill gas and carrier gas may constitute a preformed mixture. It will be recognized that such preformed mixtues exclude naturally occurring mixtures, such as air.

Since only a very small amount of kill gas is normally needed to terminate the olefin polymerization, the amount of carrier gas which is injected into the reactor may greatly exceed the amount of kill gas which is introduced into the reactor. More particularly, for example, the amount of carrier gas may be, e.g., at least about 90 mol percent of the total of kill gas and carrier gas.

The process of the present invention is particularly suitable for use in fluidized bed reaction systems as described in, e.g., the Miller U.S. Pat. No. 4,003,712, the Karol et al U.S. Pat. No. 4,302,566 and the Jorgensen et al U.S. Pat. No. 4,349,648. However, this process may also be used in other gas-phase reaction systems, such as stirred bed-type gas phase reactors, described in, e.g., the Charsley U.S. Pat. No. 4,306,044 and the Jezl et al U.S. Pat. No. 3,965,083. In addition to the other disclosures already expressly incorporated herein by reference, the disclosures of the above-mentioned Jorgensen et al U.S. Pat. No. 4,349,648 and the Jezi et al U.S. Pat. No. 3,965,083 are also expressly incorporated herein by reference.

With reference to the Drawing, disclosure from the Miller U.S. Pat. No. 4,003,712, describing an example of a fluid bed reactor system, is repeated herein as follows.

The reactor 10 consists of a reaction zone 12 and a velocity reduction zone 14. The reaction zone or lower section 12 may have a diameter to height ratio of about 1:6 to 1:7.5 and the velocity reduction zone or upper section 14 may have a diameter to height ratio of about 1:1 to 1:2.

The reaction zone 12 comprises a bed of growing polymer paticles, formed polymer particles and a minor amount of catalyst fluidized by the continuous flow of polymerizable and modifying gaseous components in the form of make up feed and recycle gas through the reaction zone. To maintain a viable fluidized bed, mass gas flow through the bed is above the minimum flow required for fluidization, preferably from about 2 to about 6 times $G_{mf}$ and more preferably from about 3 to about 5 $G_{mf}$. $G_{mf}$ is used in the accepted form as the abbreviation for the minimum mass gas flow required to achieve fluidization, C. Y. Wen and Y. H. Yu, "Mechanics of Fluidization", *Chemical Engineering Progress Symposium Series*, Vol. 62, pp. 100-111 (1966).

It is essential that the bed always contains particles to prevent the formation of localized "hot spots" and to entrap and distribute the powdery catalyst of this invention throughout the reaction zone. On start up, the reaction zone is usually charged with a base of particulate polymer particles before gas flow is initiated. The particles may be identical in nature to the polymer to be formed or different. When different, they are withdrawn with the desired formed polymer particles as the first product. Eventually, a fluidized bed of the desired particles supplants the start-up bed.

Catalyst concentration in the bed is substantially equal to the catalyst concentration in the product, namely in the order of about 0.005 to about 0.50 percent of bed volume depending on the productivity of the particular catalyst used.

The catalyst used in the fluidized bed is stored for service in a reservoir 32 under a nitrogen blanket.

Fluidization is achieved by a high rate of gas recycle to and through the bed, typically in the order of about 50 times the rate of feed of make up gas. The fluidized bed has the general appearance of a dense mass of viable particles in possibly free-vortex flow as created by the percolation of gas through the bed. Free flow of particles and therefore fluidization is substantiated by the fact that axial pressure drop through the bed is typically in the order of only about 1 psig.

Make-up gas is fed to the bed at a rate equal to the rate at which particulate polymer product is withdrawn. The composition of the make up gas is determined by a gas analyzer 16 positioned above the bed. The gas analyzer determines component deficiency in the gas being recycled and the composition of the make up gas is adjusted accordingly to maintain an essentially steady state gaseous composition within the reaction zone. The composition of the make up gas can be adjusted by signals sent from gas analyzer 16 over line 41 to the sources 42 of the components of the gas feed, from whence such components can be fed over line 43 to gas feed line 44.

To insure complete fluidization, the recycle gas and, where desired, part of the make up gas are returned to the reactor at point 18 below the bed. There exists a gas distribution plate 20 above the point of return to aid in fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gaas may then be passed through a filter 24 designed to remove small particles at high gas flow rates to prevent dust from contacting heat transfer surfaces and compressor blades.

The recycle gas is then passed through a heat exchanger 26 wherein it is stripped of heat of reaction before it is returned to the bed. By constantly removing heat of reaction, no noticable temperature gradient appears to exist within the bed. In particular, it has been observed that the bed acts to almost immediately adjust the temperature of the bed thereby maintaining itself at an essentially constant temperature under steady state conditions. The recycle gas is then compressed in a compressor 28 and returned to the reactor at its base 18 and to the fluidized bed through a distribution plate 20.

The distribution plate 20 plays an important role in the operation of the reactor. The fluidized bed contains growing and formed particulate polymer particles as well as catalyst particles. As the polymer particles are hot and possibly active, they must be prevented from settling, for if a quescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. Whatever its design, it must diffuse the recycle gas through the particles at the base of the bed to keep them viable, and also serve to support a quiescent bed of resin particles when the reactor is not in operation.

In addition to a polymerizable olefin, hydrogen as a component of the gas stream is of significant utility in the vapor phase polymerization of olefins in the fluidized bed reactor. In general, the melt index of the product increases with an increase in the hydrogen concentration in the gas stream.

Also if desired for control in the system, any gas inert to the catalyst and reactants can be present.

It is essential to operate at a temperature below the sintering point of the polymer particles. To insure that sintering will not occur, especially in the event of failure of compressor 28, operating temperatures considerably below the sintering temperature are desired. Such relatively low operating temperatures provide a safe margin for an increase in the temperture of the reactor bed in the interval between the time of the initiation of the kill system and the time of the contact of the kill gas will all of the catalyst. The Miller U.S. Pat. No. 4,003,712 states that the production of homopolymers are operating temperature of from about 90° to about 100° C. is preferred whereas an operating temperature of about 90° C. or lower is preferred for copolymers. By means of the kill system of the present invention, the operating temperatures of the reactor may be safely increased, e.g., by at least 3° C., while still maintaining a sufficient margin below the sintering temperature to prevent sintering of the polymer particles in the event of failure of compressor 28.

The Miller U.S. Pat. No. 4,003,712 further indicates that the fluid bed reactor system is capable of being operated at a pressure of from about 40 to 300 psi or more with operation at intermediate and elevated pressures favoring heat transfer since an increase in pressure increases the unit volume heat capacity of the gas.

Catalyst is injected into the bed at a rate equal to its consumption at a point 30 which is above the distribution plate 20. Preferably, the catalyst is injected at a point about $\frac{1}{4}$ to $\frac{3}{4}$ of the height of the bed. Injecting the catalyst at a point above the distribution plate is an important feature.

Injection into the area below the distribution plate may cause polymerization to begin there and eventually cause plugging of the distribution plate. Injection into a viable bed instead aids in distributing the catalyst throughout the bed and tends to preclude the formation of localized spots of high catalyst concentration which may result in the formation of "hot spots".

All or part of the make up feed stream is used to carry the catalyst into the bed. It is preferred to use only part of the make up feed stream as the carrier for the catalyst since at high productivities, the injection of a large amount of gas into the side of the bed may disrupt the characteristics of the bed and cause channeling or the like. In the alternative, part of the recycle gas stream can be diverted for the purpose of carrying catalyst into the bed.

The productivity of the bed is determined by the nature of the catalyst employed and the rate of catalyst injection. The productivity of the bed may be increased by simply increasing the rate of catalyst injection and decreased by reducing the rate of catalyst injection.

Since any change in the rate of catalyst injection will change the rate of generation of heat of reaction, the temperature of the recycle gas is adjusted upwards or downwards to accommodate the change in the rate of heat generation. This insures the maintenance of an essentially constant temperature bed. Complete instrumentation of both the fluidized bed and the recycle gas cooling system is, of course, necessary to detect any temperature change in the bed to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a thermal analysis of the gas leaving the reactor is determinative of the rate of particulate polymer formation.

The particulate polymer product is preferably continuously withdrawn at a point 34 at or close to the dispersion plate 20 in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 opens to emit a plug of gas and product to the zone 40 between it and valve 36 which then closes. Valve 38 opens to deliver the product to an external recovery zone and then it closes to wait the next sequence. The fluidized bed reactor is equipped with an adequate vent system to allow venting the bed during start up and shut down.

It will be apparent that the above-described fluid bed reactor system may be altered in a number of ways without changing the essential characteristics of the system. For example, as suggested by the Karol et al U.S. Pat. No. 4,302,566, the positioning of the heat exchanger 26 and compressor 28, as depicted in the drawing herein, may be changed such that the heat exchanger 26 becomes placed downstream of the compressor 28 in the recycle system.

When a reactor kill is initiated in an emergency situation, a kill gas such as carbon monoxide gas may be injected into the inlet chamber of the reactor. The kill gas contacts the polymerization catalyst in the bed and terminates the chemical reaction almost immediately within approximately one minute. The time required for the kill (respone time) is largely established by the time it takes to disperse the kill gas through the entire bed.

In an emergency situation with compressor flow suddenly lost, there is no gas flow through the reactor. The kill gas must be forced into the resin bed. Absent carrier gas, dispersal of the kill gas must be effected by means of a large vent flow from the top of the reactor. The recycle valve 46 is closed and the vent valve 48 opened. The kill gas from tank 54 is forced through the bed by expansion of gas from the inlet chamber (which contains the kill gas). The time required for the kill gas to reach the top of the bed is limited by the rate at which gas can be vented from the reactor.

With the present invention, the existing vent flow is augmented by a flow of carrier gas from tank 56 to the inlet chamber of the reactor. The carrier gas may be provided by an external source (e.g. higher pressure nitrogen cylinders). With an external flow attributable to injection of carrier gas, the kill gas is forced upward through the bed much more rapidly. More particularly, the rate of penetration of kill gas into the bed may be increased by a factor of at least two when a carrier gas is used in accordance with the process of the present invention.

As depicted in FIG. 1, the kill system of the present invention may be actuated by opening valves 48 and 50 and closing valve 46. This system may be actuated manually or automatically by the automatic kill initiating means 52, which responds to sensing means adapted to detect failure of the compressor 28. The kill system may also involve the manual or automatic discontinuance of the introduction of catalyst and/or olefin reactant into the reactor.

It is noted that when using a carrier gas such as nitrogen which has a heat capacity of less than the olefin reactant, the initial rate of increase of the reactor bed temperature may be greater than the increase observed with the same kill system in the absence of carrier gas. However, inspite of a more rapid initial increase in reactor bed tempeature, the carrier gas enhanced kill system has been observed to terminate the reaction faster and at a lower final temperature of the catalyst bed as compared with the non-carrier enhanced kill system.

What is claimed is:

1. In a method of terminating, under emergency conditions, an olefin polymerization reaction conducted in the presence of a transition metal-based catalyst system in a substantially vertical gas phase reactor comprising a reactant inlet at the first end thereof and a venting means at the second end thereof to maintain the temperature of the reaction below the sintering temperature of the polymer, said method comprising opening the venting means and injecting an amount of a kill gas into the reaction medium in the reactor sufficient to terminate the reaction, the improvement comprising increasing the rate of penetration of the kill gas through the reaction medium in the reactor by injecting a sufficient penetration rate-increasing amount of a non-catalyst-poisoning carrier gas into the reaction medium along with said kill gas, said kill gas and said carrier gas being injected into the reactor at the first end thereof, thereby enabling the operation of the polymerization reaction at an increased operating temperature while maintaining a sufficient margin below the sintering temperature of the polymer particles to prevent sintering of the polymer particles in the event of the emergency conditions.

2. A method according to claim 1, wherein said reaction is carried out in a fluid bed or a stirred bed reactor.

3. A method according to claim 2, wherein said kill gas is selected from the group consisting of carbon oxides, substantially pure oxygen and air.

4. A method according to claim 3, wherein said carrier gas is selected from the group consisting of ethylene, argon, helium and nitrogen.

5. A method according to claim 4, wherein said kill gas is injected at a point downstream from the point of injection of said carrier gas.

6. A method according to claim 5, wherein the amount of said carrier gas is at least about 90 mol percent of the total of kill gas and carrier gas.

7. A method according to claim 6, wherein said kill gas is carbon monoxide and said carrier gas is nitrogen.

8. A method according to claim 7 wherein said reaction is carried out in a fluid bed reactor.

9. A method for rapidly terminating a gas phase olefin polymerization reaction in a fluid bed reactor system, said reactor system comprising a vertical fluid bed reactor wherein said polymerization takes said reactor powered by a compressor, said method being actuated in the event of failure of said compressor, said method comprising the steps of:

(i) closing off said recycle line means;
(ii) injecting an amount of carbon oxide gas sufficient to terminate said polymerization reaction, said injection taking place at the bottom of said reactor at a point below the polymer bed in said reactor;
(iii) venting a gas from the top of the reactor at a point above said polymer bed; and
(iv) injecting a nitrogen carrier gas at the bottom of said reactor at a point below the polymer bed in said reactor, the amount of said nitrogen carrier gas being sufficient to increase the rate at which said carbon oxide gas is transported to the top of said polymer bed thereby enabling the operation of the fluid bed reactor at an increased temperature as compared to the operating temperature thereof without the injection of the carrier gas, wherein said steps (i)–(iv) are carried out simultaneously, substantially simultaneously or in any particular sequence, provided that said steps are carried out in a manner such that the sintering temperature of the polymer in said polymer bed is not exceeded.

10. A method according to claim 9, wherein said reactor consists essentially of a vertical reactor having a cylindrical lower section and an upper section having a cross section greater than that of said lower section, said lower section being adapted to house a polymerization zone in which the catalyzed polymerization reaction may be conducted under gas medium fluidized bed conditions, and said upper section being adapted to function as a velocity reduction zone for the recovery of particles entrained in the fluidizing medium entering said upper section from said lower section; a fluidizing medium permeable distribution plate means within and towards the base of said lower section, said distribution plate means being adapted to diffuse the fluidizing medium up through the fluidized bed in said lower section and to support said bed thereon when said bed is quiescent.

11. A method according to claim 10, wherein said fluidizing medium recycle line means is adapted to recover the fluidizing medium from the upper section of said reactor and to recycle the thus recovered fluidizing medium to the lower section of said reactor at a point below said distribution plate means.

12. A method according to claim 11, wherein said reactor system further comprises:

a catalyst injection means in catalyst supply communication with and adapted to supply particulate olefin polymerization catalyst to the side of the fluidized bed in the polymerization zone in said lower section;

a polymer product recovery means in polymer product recovery communication with, and adapted to recover polymer product from, the base of said polymerization zone and above said distribution plate means;

said polymer product means comprising a valved chamber which is adapted to recover polymer product from said reactor at a rate equal to the rate of polymer product formation with the aid of a pressure differential between the pressure within said reactor and the pressure within said chamber;

a heat exchange means within said recycle line means adapted to remove heat of reaction from the recycled fluidizing medium;

a gas analyzer means in gas communication with said velocity reduction zone and adapted to analyze gas component deficiency in the fluidizing medium in said velocity reduction zone; and wherein said fluidizing medium supply line means is in gas communcation with said recycle line means and in gas supply activating response communication with said gas analyzer means and adapted to supply deficient components of the fluidizable medium to said recycle line means in response to gas supply activating communication from said gas analyzer means.

13. A method according to claim 9 further comprising the steps of:

(v) discontinuing the introduction of the catalyst into said reactor; and (vi) discontinuing the introduction of the olefin reactant into said reactor;

wherein said steps (v) and (vi) are carried out simultaneously, substantially simultaneously or in any particular sequence with said steps (i)–(iv).

14. A method according to claim 9 wherein the total amount of nitrogen carrier gas injected is at least about 90 mol percent of the total carbon oxide gas and of nitrogen carrier gas injected.

* * * * *

UNITED STATES PATENT AND TRADEMARK OFFICE
CERTIFICATE OF CORRECTION

PATENT NO. : 4,786,695

DATED : November 22, 1988

INVENTOR(S) : John E. Cook et al

It is certified that error appears in the above-identified patent and that said Letters Patent is hereby corrected as shown below:

Column 1, line 11, delete "abandond" and insert --abandoned--,

Column 1, line 51, delete "swith" and insert --switch--,

Column 5, line 9, delete "eemergency" and insert --emergency--,

Column 5, line 15, delete "limied" and insert --limited--,

Column 5, line 63, delete "mixtues" and insert --mixtures--,

Column 7, line 27, delete "gaas" and insert --gas--,

Column 7, line 47, delete "quescent" and insert --quiescent--,

Column 8, line 10, delete "are" and insert --an--,

Column 9, line 36, delete "respone" and insert --response--,

UNITED STATES PATENT AND TRADEMARK OFFICE
CERTIFICATE OF CORRECTION

PATENT NO. : 4,786,695
DATED : November 22, 1988
INVENTOR(S) : John E. Cook et al It is certified that error appears in the above-identified patent and that said Letters Patent is hereby corrected as shown below:

Column 10, line 56, claim 9, after "takes" insert --place and a fluidizing medium recycle line means in fluid communication with--.

Signed and Sealed this

Thirtieth Day of January, 1990

*Attest:*

JEFFREY M. SAMUELS

*Attesting Officer*     *Acting Commissioner of Patents and Trademarks*